April 25, 1944.  W. L. GROENE  2,347,259
LATHE HEADSTOCK TRANSMISSION
Filed April 16, 1942  2 Sheets-Sheet 1
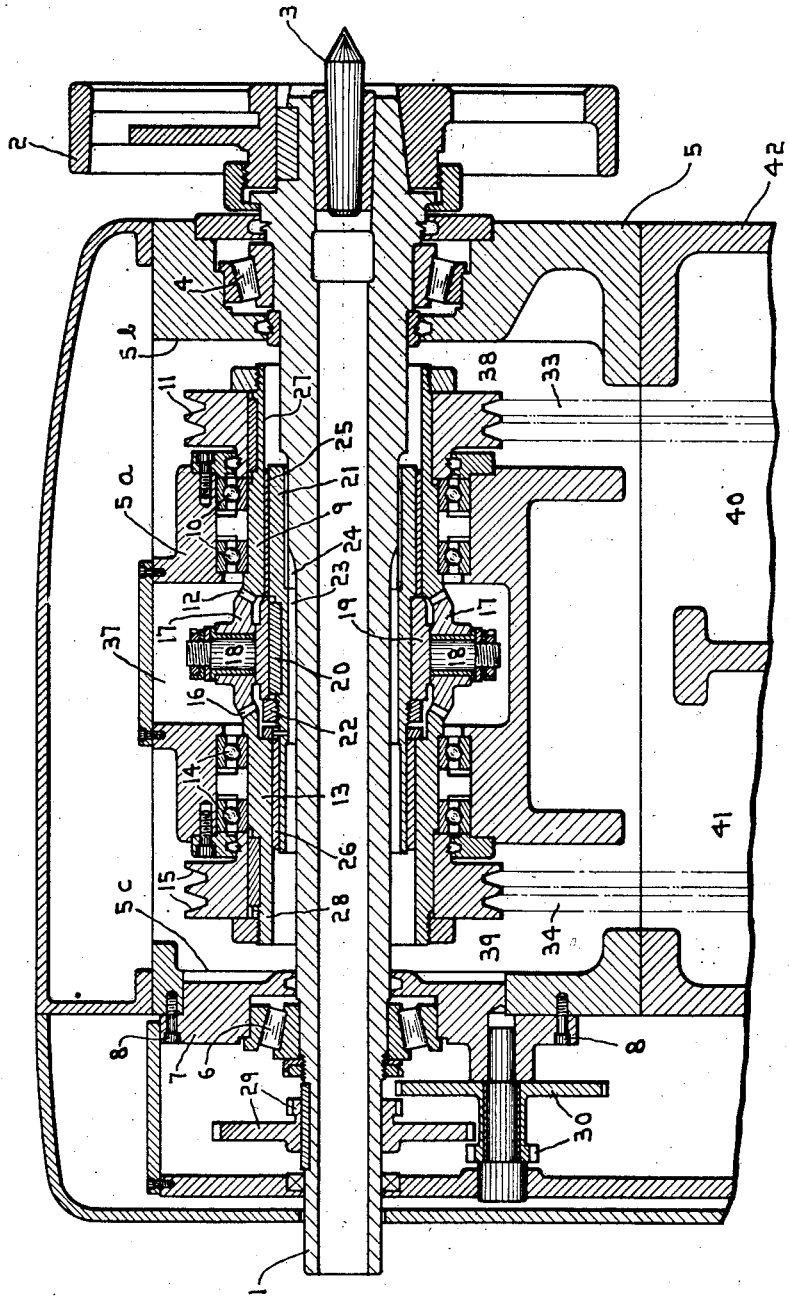
FIG. I
INVENTOR.
WILLARD L. GROENE
BY Willard L. Groene

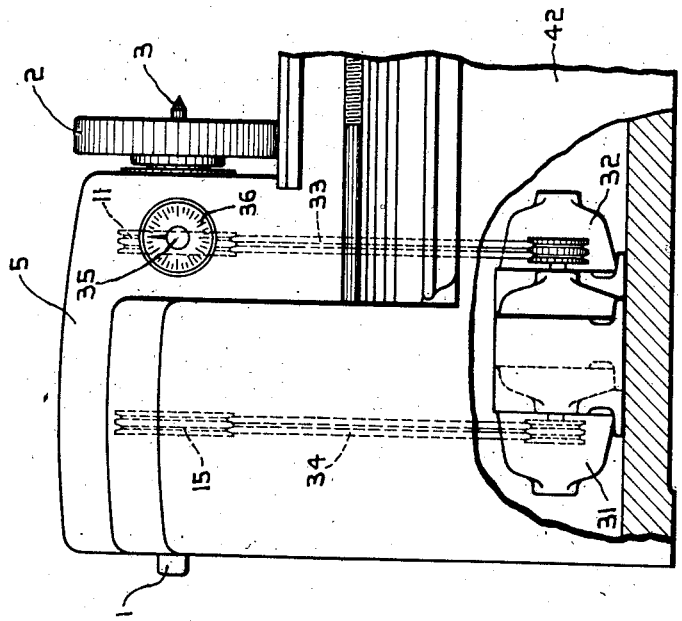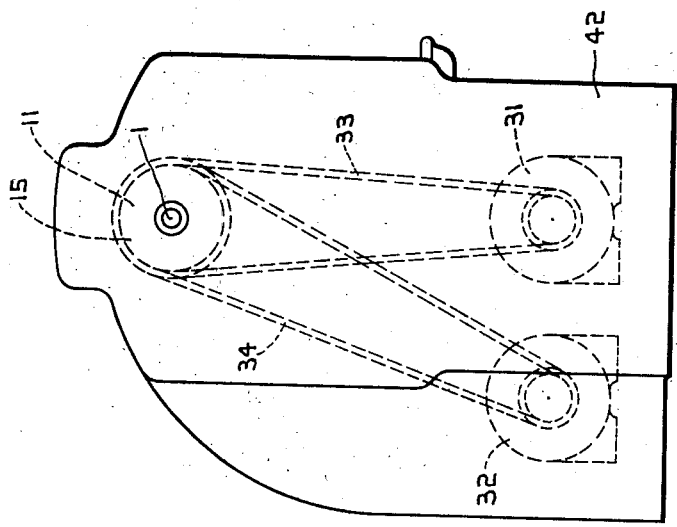

Patented Apr. 25, 1944

2,347,259

UNITED STATES PATENT OFFICE 2,347,259

LATHE HEADSTOCK TRANSMISSION

Willard L. Groene, Cincinnati, Ohio, assignor to The R. K. Le Blond Machine Tool Company, Cincinnati, Ohio, a corporation of Delaware Application April 16, 1942, Serial No. 439,243

5 Claims. (Cl. 82—28)

This invention pertains to improvements in driving transmissions for machine tool work spindles, in particular lathe headstocks, and has as one of its chief objects to provide a variable speed driving mechanism for such a lathe headstock spindle, having an infinite range of speeds from zero to the top speed desired for the lathe headstock spindle. It is proposed to accomplish this result solely by means of the use of variable electric driving means and appropriately connecting said driving means to differential transmission mechanism associated with the lathe spindle and to appropriately control the variable speed electric driving means to accomplish the entire speed range for the work spindle from zero to the top speed desired.

Heretofore, when it was desired to provide a very wide range to control a variable speed electrical motor, a combination of both armature and field regulation was customarily used in conjunction with a shunt wound adjustable speed motor. But for all speeds below the basic speed of the motor, that is the normal low speed at which it is designed to operate, the motor is in the adjustable speed range, wherein its speed is controlled by varying the motor field current with the result that the load at this range determines the speed obtained so that the motor looses complete efficiency and speed control whenever any heavy cutting is to be attempted with the lathe headstock when the motor is operating in this very slow range of speed. This arrangement, therefore, is totally inadequate to meet the demands found in a lathe headstock power transmission application in which heavy cutting is invariably done at relatively low speed requiring maximum horsepower in these low speed ranges as well as in the high speed ranges for the machine tool. This comes about because usually, as the work increases in diameter, it is necessary to run the spindle correspondingly slower in order to maintain constant cutting speed and prevent burning or damage to the cutting tool when working on these large diameters. As a result it is frequently necessary to rotate the work spindles very slowly and take a relatively heavy cut out on a large raidal diameter from the center of the work spindle as this must be met by a driving mechanism capable of delivering maximum horsepower at the very slow speed range for the transmission.

With these former difficulties clearly in mind, applicant has set out to devise a transmission having the desirable features of an infinite stepless range of speeds through the entire range but which is capable of producing sufficient power at the lower speeds to effect the proper cutting action on the work when the lathe is being operated in this low range. In keeping with this problem, it is necessary, of course, particularly from a commercial point of view, to provide standard apparatus and parts in order to accomplish results within the economic considerations necessary in providing a sale price for the machine. It is, therefore, applicant's objective to provide the desirable features of an infinitely variable speed transmission by the use of conventional electric motor and control mechanism in conjunction with a simplified mechanical differential interconnecting means between the motor and the work spindle so as to produce not only a driving transmission capable of producing the desired results but also producing the results with apparatus of simple construction and an inexpensive apparatus.

The basic principle applicant has conceived is that of providing a pair of driving motors each connected through a differential transmission mechanism to a work spindle and to vary the speed of these motors through their normal speed range, not below the basic speed of either motor, to produce the normal high speed variation necessary for the work spindle. It is then the object to reverse one of the motors and maintain a difference of speed of one motor relative to the other while operating in the reverse direction, ultimately bringing these motors to identically the same speed when operating in opposite directions to effect the complete range of slow speeds from the basic speed of both motors to zero speed when both motors are operating at the same speed but in opposite directions.

It is a further object of this invention to provide a single dial controlled electrical apparatus, such as appropriate rheostat mechanism interconnected with these motors to effect this complete operation of the motors through their variable speed range from top speed to basic speed and in reversing one of the motors and causing a differential rate of rotation in opposite direction of the motors to take the speed range from the basic speed to the zero speed. In this way any speed rate may be selected through an infinite series of steps and during the cutting action of the tool on the work without any of the former difficulties of trying to effect the shifting of a gear transmission by engagement and disengagement of sliding gears or of clutches which is impossible when taking heavy cuts on the lathe.

Another very significant feature in connection with this invention is that it provides a direct belt drive from the driving motors to the work spindle at all times in the higher ranges of speed for the lathe, thereby eliminating direct gear driving mechanism on the work spindle which is present in former geared headstocks. This transmission does not cause irregularities in the work surfaces and chatter and the impossibility of providing the necessary high degree of finish when the direct belt driving is provided at the higher speeds. It is, also, to be noted that direct belt driving is utilized at all times and is progressively automatically converted into gear driving through the differential transmission as the zero speed of the lathe headstock is reached. Therefore, there are no steps or sudden changes from belt to gear driving when going through the entire range of the headstock transmission.

In utilizing such a variable speed transmission which is capable of going from zero to the maximum speed with an infinite series of steps, it is obvious that in connection with appropriate apparatus this lathe headstock can be made to function as a variable speed drive, keeping the cutting speed constant for a cutting tool as it feeds radially relative to the work spindle axis of the lathe. This, of course can not be accomplished in any other headstock transmission because first of all the transmission has a stepped series of speed changes or else lacks the necessary control possible to make the lathe operate efficiently through the entire range of speeds of the machine.

Another feature of this invention involving significant constructional details in that of mounting the work spindle so as to provide a center bearing support for the spindle as is desirable practice in lathe headstocks while at the same time providing an isolated housing for the differential mechanism operating in appropriate lubricant while at the same time permitting easy access to the belts of the driving transmission for replacement or adjustment or tightening of these belts and to maintain the belt driving transmission in isolated compartments separate from the differential transmission so that they will be free of lubricant and other foreign matter which might otherwise impair their operating efficiency.

Further features and advantages of this invention will appear in the detailed description of the drawings in which:

Figure 1 is a diagrammatic vertical longitudinal section through a typical lathe transmission incorporating my invention and showing the differential drive mechanism mounted in the headstock and connected to the work spindle of the lathe.

Figure 2 is a left hand end view of the lathe incorporating the novel driving transmission of this invention and showing the two independent driving motors mounted in the base of the machine with the belt drives leading up to the pulleys on the differential transmission mechanism in the lathe headstock.

Figure 3 is a fragmentary front elevational view of a lathe showing the headstock end thereof and the two driving motors, and the belt drive connected to the differential work spindle transmission and also indicating the single dial control for effecting the entire range of speed for the headstock.

This invention is shown applied to a lathe headstock having a work spindle 1 upon which is mounted the usual face plate or chuck 2 and centers 3 and is journaled on an anti-friction bearing 4 in the headstock housing 5 and journaled at its rear end in an anti-friction bearing 6 carried in a demountable bracket 7 fixed to the rear end of the headstock housing 5 by suitable screws 8. Also, journaled in a central supporting portion 5a of the headstock 5 is the driving sleeve 9 mounted on suitable bearings 10 and upon which is fixed the driving pulley 11 and upon which is formed the bevel gear 12. Also, in this portion 5a is mounted the driving sleeve 13 on suitable bearings 14 and which has fixed on it a driving pulley 15 and formed on it a bevel gear 16.

Each of the bevel gears 12 and 16 are in driving engagement with the bevel pinion 17 journaled on the stud 18 formed on the differential spider 19 which is appropriately keyed at 20 and locked to the driving sleeve 21 by a suitable lock nut 22 so that the spider and sleeve rotate together as an itnegral member. In the bore of the driving sleeve 21 is formed an appropriate spline 23 which nicely fits in a mating spline 24 on the work spindle 1 so that rotation of the spider and work spindle 1 are effected in positive driving engagement at all times. This construction, also, permits the withdrawal of the work spindle without disturbing any of the differential driving mechanism comprising the sleeves 9, 13 and 21. It is to be further noted that the work spindle is supported through the spline 24 and the sleeve 21 by journaled engagement of the outside diameter of the piece 21 with the bushings 25 and 26 fixed in the bores 27 and 28 respectively of the driving means 9 and 13 so that the spindle is rigidly supported intermediate its main bearings 4 and 6 for maximum rigidity and strength.

Feed driving power take off is transmitted through the gears 29 and 30 which is appropriately connected to the usual change gearing mechanism to the lathe tool feeding devices as in conventional lathe practices.

Main driving power for this transmission is derived from two electric driving motors 31 and 32. The motor 31 is connected through appropriate belts 33 to the driving pulley 11 while the motor 32 is connected through appropriate belts 34 to the driving pulley 15. For exemplary purposes, in this particular transmission it is practical to use standard variable speed shunt wound D. C. motors, having a speed variation of 3 to 1 between top speed and basic speed and each of these motors is capable of being reversed relative to one another or to be both reversed while rotating in the same direction or both reversed while rotating in opposite directions relative to each other.

Each of these motors are to be controlled by suitable rheostat means (not shown) through their variable speed range and by means of appropriate electric control means (not shown) to effect reversal of the motors at the appropriate time. All of said electrical mechanism being interlocked and operable from a single control knob 35 rotated on the front of the headstock, 33, and which have appropriate graduations on an associated dial 36 showing the entire range of speeds by complete rotation of the knob 35 through the entire range.

As a suggested method of operation using specific quantities in which a 3 to 1 speed range is provided for each of the motors 31 and 32, the following spindle speed analysis might be utilized in which the motors have a speed range running from 600 R. P. M. at basic speed to 1800 R. P. M. at full speed. This tabulation is indicated below.

*Spindle speed analysis*

| Pulley 15 motor 32 | Pulley 11 motor 31 | Speed of spindle 1 |
|---|---|---|
| 1,800 | 1,800 | 1,800 |
| 600 | 600 | 600 |
| Reverse 600 | 1,800 | 600 |
| Reverse 600 | 600 | 0 |

In this specific exemplary set up it will be noted that the two motors, both running in the same direction and at top speed of 1800 will of course produce 1800 R. P. M. spindle speed since both of the bevel gears 12 and 16 will be driving the bevel pinions 17, which under this condition will not rotate, to thereby rotate the spider 19 at 1800 R. P. M. Both motors are then gradually reduced simultaneously by manipulation of the single control dial while rotating at same speeds in the same direction until their basic speeds of 600 R. P. M. are reached, thereby giving a total of 3 to 1 speed range for the work spindle with direct belt driving since the differential pinions 17 are not rotating and there is no gear action taking place in the differential transmission under these conditions. With both motors thus rotating at 600 R. P. M. in the same direction the work spindle is thus brought to the 600 R. P. M. speed.

The next step in further rotation of the control dial and associated rheostat and electric control mechanism by the medium of the knob 35, is to effect reversal of the motor 32 at its basic speed in the opposite direction, at 600 R. P. M. in the reverse direction in this instance. The other motor 31 is meanwhile accelerated back again to its top speed of 1800 R. P. M., but still rotating in the same direction as in the former instance. Under these conditions we again get the same spindle speed of 600 R. P. M. produced above when both motors are operating in the same direction at basic speed so as to begin the new series of speed ranges down to zero at the exact concluding point of the direct belt drive arrangement. Under these conditions of reverse operation of motor 32 relative to motor 31 and in which the motor 31 is operating at its top speed the result will be the difference of the speeds of the pulleys 11 and 15 divided by 2 resulting in the spider 19 and therefore the spindle 1 rotating at 600 R. P. M. Now by gradually decreasing the motor speed of motor 31 from its top speed toward its basic speed with the motor 32 still operating in the reverse direction at its basic speed the spindle speed will gradually approach zero in accordance with the principle of the difference of the speeds divided by 2, so that when both motors are operating at the same speed in opposite directions, 600 R. P. M. in this particular illustrative case, the work spindle will not rotate at all because the two bevel gears 12 and 16 will be rotating exactly at the same speed in opposite directions resulting in the pinion 17 merely rotating on the studs 18 of the spider 19 but producing no rotation of the work spindle 1.

Thus by appropriately controlling the motors, in a manner substantially as set forth above, it is possible to effect the complete stepless speed range for the work spindle from maximum speed to zero speed by the simple manipulation of a control knob 35 on the front of the lathe headstock and this, of course, can obviously be accomplished even under load and cutting action of the work spindle since there is never at any time a disconnection of the motors 31 and 32 from direct driving connection with the work spindle 1.

It is to be further noted that the differential spider and associated bevel pinions 17 and the driving bevel gears 12 and 16 are totally enclosed in a chamber 37 provided in the middle of the headstock housing 5 and which is kept appropriately filled with lubricant for maintaining proper operating efficiency for the bevel gear differential gearing mechanism.

It is to be further noted that this chamber 37 is totally closed off from the two belt compartments 38 and 39 provided each side of this center supporting housing 5a in the headstock and between the end walls 5b and 5c of the headstock housing 5 so as to provide access compartments for the driving pulleys 11 and 15 and their respective belts 33 and 34 which is totally divorced from any lubricant which might escape from the differential transmission mechanism in the compartment 37 while at the same time providing easy means for installing or removing belts from the pulleys 11 and 15 when necessary. This may be done by merely withdrawing the work spindle 1 from the headstock housing without disturbing the arrangement in the housing 5a for the differential transmission mechanism, the spindle merely sliding out of its splined connection 23—24 with the main spider sleeve 21 of the differential transmission mechanism. These belts may be inserted up to the base compartment 40 and 41 of the base 42 of the lathe and connected to the driving motor 31 and 32 which are mounted on appropriate motor plates for keeping proper tension in the belts (not shown) so that their operating efficiency may be maintained in the highest possible condition at all times.

It must be further understood that since the motors do not operate below their basic speed but always operate at a relatively high efficient speed, both of the motors are functioning under most efficient conditions and also the belt transmission need not be excessively heavy for low speed from the work spindle when heavy cutting is taking place, since the speeds of the motor and belts are maintained at this high efficient rate of operation.

When it is desirable to operate the lathe spindle in the opposite direction through the entire range of speeds, it is merely necessary to effect, through appropriate electrical apparatus, the complete reversal of both of the motors so as to maintain their relative rotation whether at the same speed or in the opposite direction relative to each other for either direction of rotation of the spindle desired. Thus, if both motors were operating in the same direction it would be merely necessary to reverse both motors and in instances where one motor was operating in the reverse of the other it would simply be a question of reversing both of those motors and still maintaining their opposite rotation but their total relative rotation would take place in the opposite direction from that initially started.

Having thus fully set forth and described my invention, what I claim as new and desire to secure by United States Letters Patent is:

1. In a lathe work spindle driving transmission; a headstock housing; a rotatable work spindle journaled directly in said headstock housing; a differential driving transmission journaled directly in said headstock independent of said work spindle means in said differential providing a support for said work spindle intermediate its journal bearings in said headstock housing; and a pair of driving motors for actuating said differential transmission mechanism by varying the speeds and directions of rotation of said motors so as to effect variable speeds of rotation for said work spindle.

2. In a lathe work spindle driving transmission; a headstock; a rotatable work spindle journaled at each end in said headstock; a differential transmission mechanism journaled in said headstock intermediate the journal bearings of said work spindle; a differential spider fixed on said work spindle intermediate its journal bearings; bevel pinions journaled on said spider; driving bevel gears journaled in said headstock housing and engaging the pinions of said spider; a pulley on each of said bevel gears; a separate motor connected to each of said pulleys; and belted transmission means between said motors and said pulleys located each side of said differential transmission mechanism and between said journal bearings of said work spindle in said headstock.

3. In a lathe work spindle driving transmission; a headstock housing; a rotatable work spindle journaled at each end in said headstock housing; a differential spider fixed on said work spindle intermediate said journals; pinions journaled on said spider; a bevel gear, located to one side of said spider and in engagement with the pinions thereof, journaled directly in a central supporting member of said headstock housing; a second bevel gear, located on the other side of said differential spider and engaging said bevel pinions, journaled directly in a central supporting housing of said headstock housing; a pulley on each of said bevel gears; and journal means between said bevel gears and said work spindle independent of said spindle journals to support said work spindle intermediate its ends in said central supporting portion of said headstock.

4. In a lathe work spindle driving transmission; a headstock; a rotatable work spindle journaled at each end in said headstock; a differential spider fixed on said work spindle; pinions journaled on said spider; a bevel gear, located to one side of said spider in engagement with the pinions thereof, journaled in a central supporting member of said headstock; a second bevel gear, located on the other side of said differential spider and engaging said bevel pinions, journaled in a central supporting housing of said headstock; a second bevel gear, located on the other side of said differential spider and engaging said bevel pinion, journaled in a central supporting housing of said headstock; a pulley on each of said bevel gears; journal bearing means between said bevel gears and said work spindle whereby said work spindle is supported intermediate its ends in said central supporting portion of said headstock; a pair of driving motors located in the base of said machine below said headstock; belted transmission means connecting one of said motors with one of said pulleys and the other of said motors with the other of said pulleys; and means for operating each of said motors at variable speeds and in reversible directions relative to each other to effect a series of infinitely variable speed ranges in said work spindle.

5. In a lathe work spindle driving transmission; a headstock; a rotatable work spindle journaled at each end in said headstock; a differential spider fixed on said work spindle; pinions journaled on said spider; a bevel gear, located to one side of said spider and in engagement with the pinions thereof, journaled in a central supporting member of said headstock; a second bevel gear, located on the other side of said differential spider and engaging said bevel pinions, journaled in a central supporting housing of said headstock; a pulley on each of said bevel gears; and journal means between said bevel gears and said work spindle whereby said work spindle is supported intermediate its end in said central supporting portion of said headstock; a pair of driving motors located in the base of said machine below said headstock; and belted transmission means connecting one of said motors with one of said pulleys and the other of said motors with the other of said pulleys; and means for operating each of said motors at variable speeds and in reversible directions relative to each other to effect an infinitely variable speed range in said work spindle; and a single control mechanism effective to render said motors operable to produce said speed variations in said spindle.

WILLARD L. GROENE.